United States Patent
Huang et al.

(10) Patent No.: US 9,542,640 B1
(45) Date of Patent: Jan. 10, 2017

(54) RADIO FREQUENCY IDENTIFICATION TAG APPARATUS WITH LASER DIRECT STRUCTURING ANTENNA

(71) Applicant: Jogtek Corp., Taipei (TW)

(72) Inventors: Wei-Chun Huang, Taipei (TW); Tsung-Hsing Hsieh, Taipei (TW)

(73) Assignee: JOGTEK CORP., Taipei (TW)

( * ) Notice: Subject to any disclaimer, the term of this patent is extended or adjusted under 35 U.S.C. 154(b) by 0 days.

(21) Appl. No.: 14/928,279

(22) Filed: Oct. 30, 2015

(51) Int. Cl.
 G06K 7/08 (2006.01)
 G06K 19/06 (2006.01)
 G06K 19/077 (2006.01)
 H01Q 13/10 (2006.01)

(52) U.S. Cl.
 CPC ........ G06K 19/07794 (2013.01); H01Q 13/10 (2013.01)

(58) Field of Classification Search
 USPC .... 235/439, 451, 492; 340/10.1–10.4, 572.1, 340/572.2
 See application file for complete search history.

(56) References Cited

U.S. PATENT DOCUMENTS

| | | | |
|---|---|---|---|
| 6,404,339 B1 * | 6/2002 | Eberhardt | G06K 7/0008 340/10.1 |
| 2006/0017659 A1 * | 1/2006 | Ogawa | B41J 3/4076 345/30 |
| 2008/0297350 A1 * | 12/2008 | Iwasa | G06K 19/0702 340/572.1 |
| 2010/0079416 A1 * | 4/2010 | Chung | G02F 1/13336 345/204 |
| 2011/0148208 A1 * | 6/2011 | Tanada | G06F 3/147 307/66 |
| 2013/0194076 A1 * | 8/2013 | Ho | G06Q 10/06 340/10.4 |
| 2013/0229362 A1 * | 9/2013 | Liu | G06F 3/041 345/173 |
| 2013/0260675 A1 * | 10/2013 | Chan | H04B 5/0062 455/41.1 |
| 2014/0043248 A1 * | 2/2014 | Yeh | H01Q 7/00 345/173 |
| 2014/0231518 A1 * | 8/2014 | Yosui | H01Q 1/2216 235/439 |

* cited by examiner

Primary Examiner — Tuyen K Vo
(74) Attorney, Agent, or Firm — Chun-Ming Shih; HDLS IPR Services

(57) ABSTRACT

A radio frequency identification tag apparatus includes a display unit, a radio frequency identification tag unit and a laser direct structuring antenna unit. The radio frequency identification tag unit is electrically connected to the display unit. The laser direct structuring antenna unit is wirelessly coupled to the radio frequency identification tag unit.

9 Claims, 4 Drawing Sheets

RADIO FREQUENCY IDENTIFICATION TAG APPARATUS WITH LASER DIRECT STRUCTURING ANTENNA

BACKGROUND OF THE INVENTION

Field of the Invention

The present invention relates to a radio frequency identification tag apparatus, and especially relates to a radio frequency identification tag apparatus with a laser direct structuring antenna.

Description of the Related Art

The radio frequency identification (RFID) tag is very popular now. The radio frequency identification system comprises three parts as following. (1) The tag or the transponder: It comprises an IC chip which can store information and an antenna with special packaging. (2) The reader or the interrogator: It comprises an antenna, an RF transceiver module and a data processing module to communicate with the tag or the transponder. (3) The host computer: It processes data sent from the reader or the interrogator.

The related art radio frequency identification tag is flat, which is attached on the object. Using the related art radio frequency identification tag will usually have a lot of problems, so that the identification data in the related art radio frequency identification tag cannot be read. Especially when the object is made of conduct materials, the incident wave is totally reflected and the phase difference is 180 degrees, so that the effective reading distance of the related art radio frequency identification tag is reduced from several meters to 1~2 centimeters. Even the related art radio frequency identification tag cannot work. So the related art radio frequency identification tag cannot be applied to metal objects.

Another related art radio frequency identification tag may be applicable to metal objects. However, such related art radio frequency identification tag has a large volume, the working distance is not long, and the cost is too high. Especially, the working distance is too short to be applied to most of the application for the radio frequency identification tags. Therefore, the disadvantages of the related art radio frequency identification tags are that the volume is large, the working distance is not long, and the cost is too high.

SUMMARY OF THE INVENTION

In order to solve the above-mentioned problems, an object of the present invention is to provide a radio frequency identification tag apparatus with a laser direct structuring antenna.

In order to achieve the object of the present invention mentioned above, the radio frequency identification tag apparatus is applied to a carrier. The radio frequency identification tag apparatus comprises a display unit, a radio frequency identification tag unit and a laser direct structuring antenna unit. The radio frequency identification tag unit is electrically connected to the display unit. The laser direct structuring antenna unit is wirelessly coupled to the radio frequency identification tag unit.

Moreover, the radio frequency identification tag unit comprises a radio frequency identification tag antenna, a radio frequency identification tag chip, a current-to-voltage converting circuit and a voltage adjusting circuit. The radio frequency identification tag antenna is wirelessly coupled to the laser direct structuring antenna unit. The radio frequency identification tag chip is electrically connected to the radio frequency identification tag antenna. The current-to-voltage converting circuit is electrically connected to the radio frequency identification tag antenna. The voltage adjusting circuit is electrically connected to the radio frequency identification tag chip and the current-to-voltage converting circuit.

Moreover, the radio frequency identification tag apparatus further comprises a plastic panel. The display unit, the radio frequency identification tag unit and the laser direct structuring antenna unit are arranged on the plastic panel.

Moreover, the radio frequency identification tag apparatus further comprises a microprocessor electrically connected to the radio frequency identification tag unit.

Moreover, the radio frequency identification tag apparatus further comprises a sensor electrically connected to the microprocessor. The sensor detects a temperature and a vibration level of the carrier.

Moreover, the radio frequency identification tag apparatus further comprises a driver electrically connected to the microprocessor and the display unit. The driver drives the display unit to display an information.

Moreover, the radio frequency identification tag apparatus further comprises a connection interface electrically connected to the microprocessor and the radio frequency identification tag unit.

Moreover, the display unit is an electronic paper or a liquid crystal display.

Moreover, the radio frequency identification tag unit is a dual radio frequency (the ultrahigh frequency and the high frequency) identification tag.

Moreover, the connection interface is a serial peripheral interface (SPI) or an inter-integrated circuit (I2C).

The advantages of the present invention comparing to the related art radio frequency identification tag which is applicable to metal objects are that the volume is reduced, the working distance is increased, and the cost is reduced. The advantage of the present invention comparing to the related art radio frequency identification tag which is not suitable for metal objects is that the working distance is increased.

DETAILED DESCRIPTION OF THE INVENTION

Please refer to following detailed description and figures for the technical content of the present invention. The following detailed description and figures are referred for the present invention, but the present invention is not limited to it.

Figure 1:
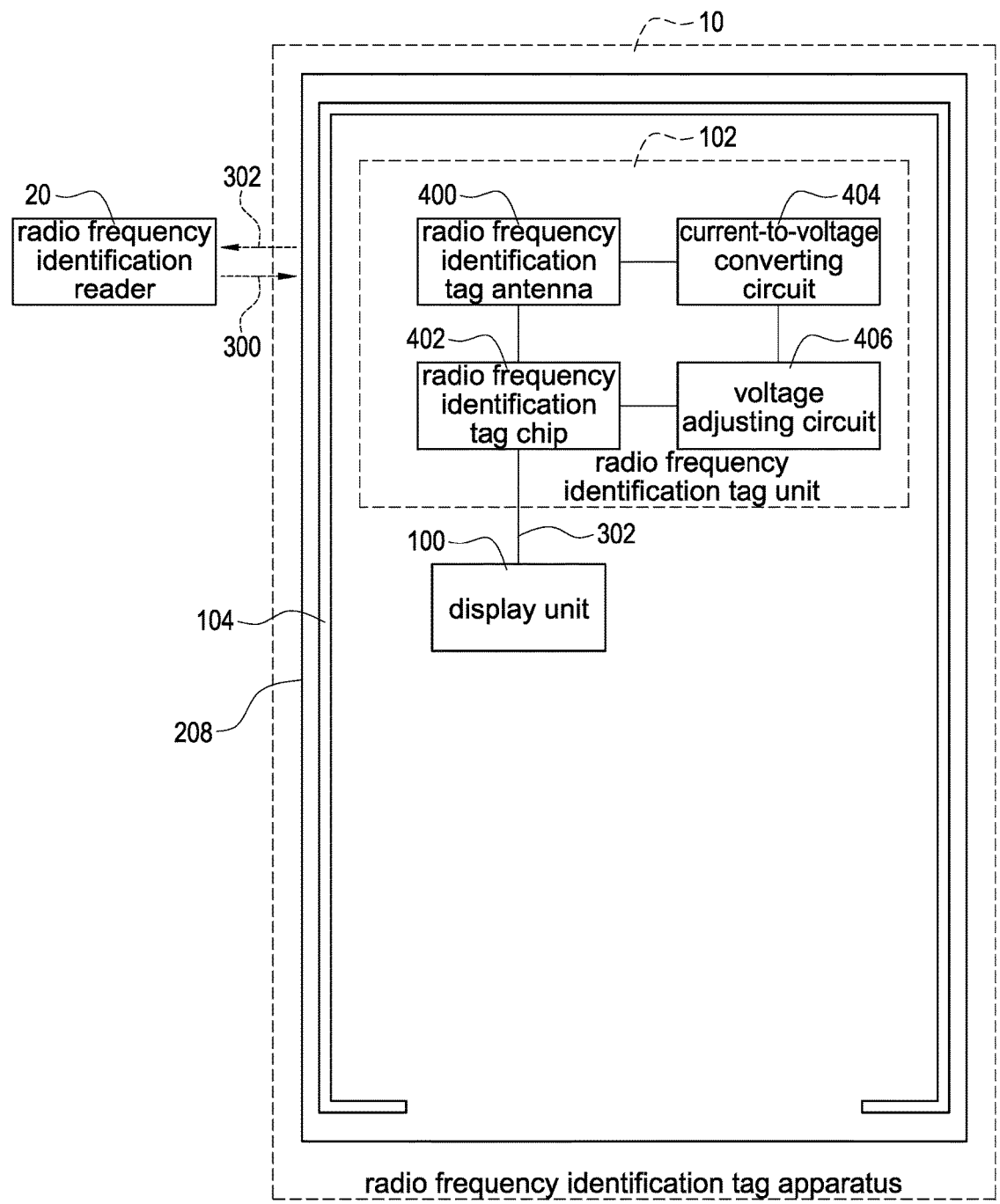
FIG. 1 shows a block diagram of the first embodiment of the radio frequency identification tag apparatus with a laser direct structuring antenna of the present invention.

FIG. 1 shows a block diagram of the first embodiment of the radio frequency identification tag apparatus with a laser direct structuring antenna of the present invention. A radio frequency identification tag apparatus 10 is applied to a metal (not shown in FIG. 1). The radio frequency identification tag apparatus 10 comprises a display unit 100, a radio frequency identification tag unit 102 and a laser direct structuring antenna unit 104. The radio frequency identification tag unit 102 comprises a radio frequency identification tag antenna 400, a radio frequency identification tag chip 402, a current-to-voltage converting circuit 404 and a voltage adjusting circuit 406.

The display unit 100 is electrically connected to the radio frequency identification tag unit 102. The laser direct structuring antenna unit 104 is wirelessly coupled to the radio frequency identification tag unit 102. The radio frequency identification tag antenna 400 is electrically connected to the current-to-voltage converting circuit 404 and the radio frequency identification tag chip 402. The radio frequency identification tag chip 402 is electrically connected to the display unit 100 and the voltage adjusting circuit 406. The current-to-voltage converting circuit 404 is electrically connected to the voltage adjusting circuit 406.

The radio frequency identification reader 20 sends a wireless radio frequency signal 300 to the laser direct structuring antenna unit 104. The laser direct structuring antenna unit 104 is wirelessly coupled to the radio frequency identification tag antenna 400, so that the laser direct structuring antenna unit 104 sends the wireless radio frequency signal 300 to the radio frequency identification tag antenna 400. The radio frequency identification tag antenna 400 induces the wireless radio frequency signal 300 to generate a current. The radio frequency identification tag antenna 400 sends the current to the current-to-voltage converting circuit 404. The current-to-voltage converting circuit 404 converts the current into a first voltage. The current-to-voltage converting circuit 404 sends the first voltage to the voltage adjusting circuit 406. The voltage adjusting circuit 406 adjusts the first voltage as a second voltage.

The voltage adjusting circuit 406 sends the second voltage to the radio frequency identification tag chip 402 to drive the radio frequency identification tag chip 402. According to the wireless radio frequency signal 300, the radio frequency identification tag chip 402 generates a feedback signal 302. The radio frequency identification tag chip 402 sends the feedback signal 302 to the display unit 100. After the display unit 100 receives the feedback signal 302, the display unit 100 displays an information of the feedback signal 302.

When the radio frequency identification tag unit 102 sends the feedback signal 302 back to the radio frequency identification reader 20, the radio frequency identification tag antenna 400 is wirelessly coupled to the laser direct structuring antenna unit 104, so that a working distance of the radio frequency identification tag antenna 400 is increased and a transmitting data distance of the radio frequency identification tag apparatus 10 is longer. After being coupled, the radio frequency identification tag apparatus 10 generates a coupled antenna frequency band. The coupled antenna frequency band is between 860 MHz to 960 MHz, which comprise the ultrahigh frequency band in the world.

The radio frequency identification tag apparatus 10 further comprises a plastic panel 208. The display unit 100, the radio frequency identification tag unit 102 and the laser direct structuring antenna unit 104 are arranged on the plastic panel 208.

Moreover, after the radio frequency identification tag antenna 400 is wirelessly coupled to the laser direct structuring antenna unit 104, the radio frequency identification tag apparatus 10 can provide a larger antenna gain, and a gain loss of the radio frequency identification tag unit 102 is 0 db. The radio frequency identification tag apparatus 10 proceeds with wireless radio frequency signals transmission and receiving without loss, so that the efficiency of the radio frequency identification tag apparatus 10 is improved.

Moreover, the radio frequency identification tag apparatus 10 can still be wirelessly coupled to the metal, so that the transmitting data distance of the radio frequency identification tag apparatus 10 is longer.

Moreover, the radio frequency identification tag unit 102 is a semi-passive radio frequency identification tag which comprises a battery (not shown in FIG. 1). The battery supplies power to the radio frequency identification tag chip 402, so that the radio frequency identification tag chip 402 works. The battery is a carbon-zinc battery or an alkaline battery.

Figure 2:
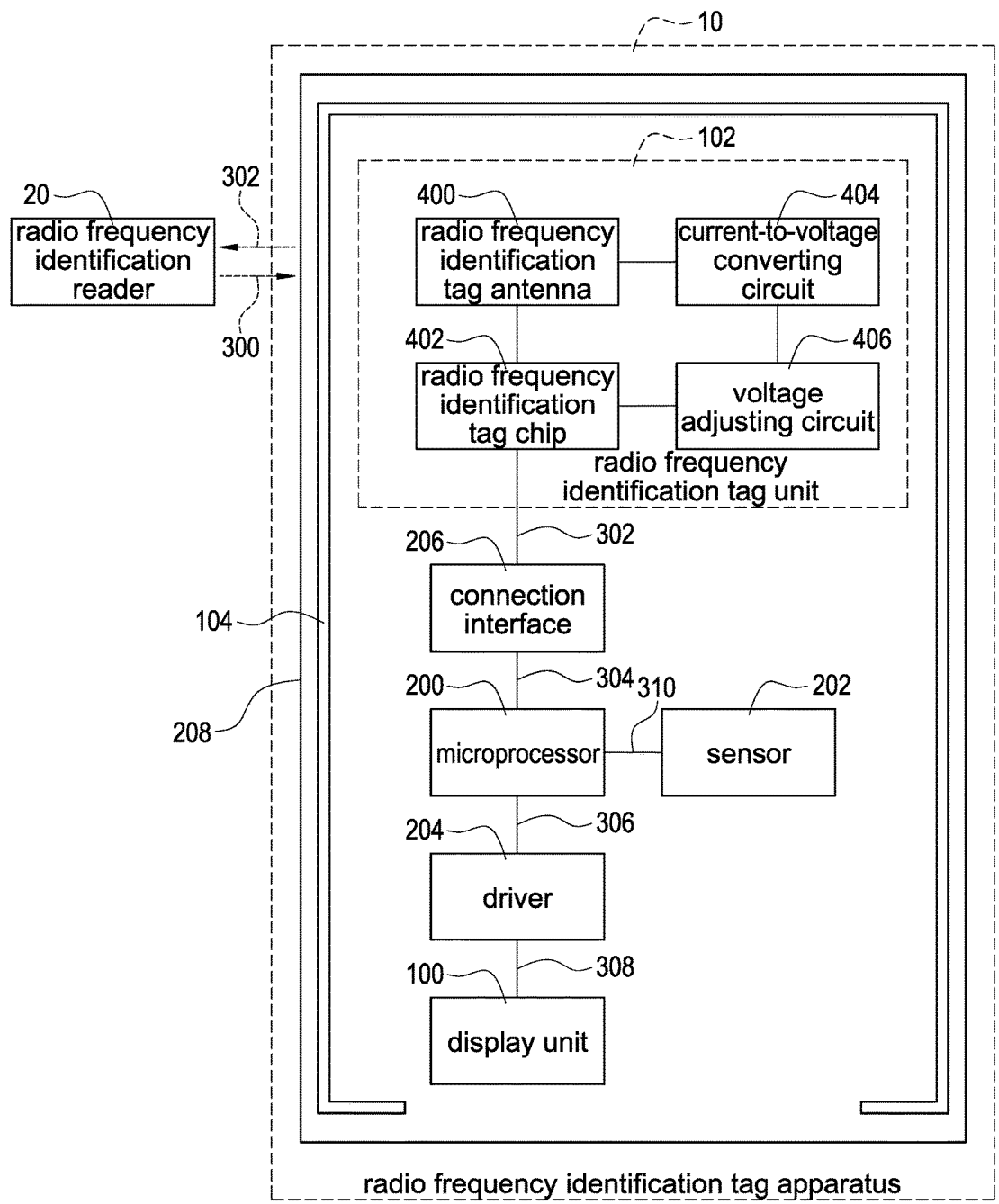
FIG. 2 shows a block diagram of the second embodiment of the radio frequency identification tag apparatus with a laser direct structuring antenna of the present invention.

FIG. 2 shows a block diagram of the second embodiment of the radio frequency identification tag apparatus with a laser direct structuring antenna of the present invention. A radio frequency identification tag apparatus 10 is applied to a metal (not shown in FIG. 2). The radio frequency identification tag apparatus 10 comprises a display unit 100, a radio frequency identification tag unit 102, a laser direct structuring antenna unit 104, a microprocessor 200, a sensor 202, a driver 204 and a connection interface 206. The radio frequency identification tag unit 102 comprises a radio frequency identification tag antenna 400, a radio frequency identification tag chip 402, a current-to-voltage converting circuit 404 and a voltage adjusting circuit 406.

The radio frequency identification tag unit 102 is electrically connected to the connection interface 206. The connection interface 206 is electrically connected to the microprocessor 200. The connection interface 206 is a serial peripheral interface (SPI) or an inter-integrated circuit (I2C). The microprocessor 200 is electrically connected to the sensor 202. The microprocessor 200 is electrically connected to the driver 204. The driver 204 is electrically connected to the display unit 100. The laser direct structuring antenna unit 104 is wirelessly coupled to the radio frequency identification tag unit 102. The radio frequency identification tag antenna 400 is electrically connected to the current-to-voltage converting circuit 404 and the radio frequency identification tag chip 402. The radio frequency identification tag chip 402 is electrically connected to the connection interface 206 and the voltage adjusting circuit 406. The current-to-voltage converting circuit 404 is electrically connected to the voltage adjusting circuit 406.

The radio frequency identification reader 20 sends a wireless radio frequency signal 300 to the laser direct structuring antenna unit 104. The laser direct structuring antenna unit 104 is wirelessly coupled to the radio frequency identification tag antenna 400, so that the laser direct structuring antenna unit 104 sends the wireless radio frequency signal 300 to the radio frequency identification tag antenna 400. The radio frequency identification tag antenna 400 induces the wireless radio frequency signal 300 to generate a current. The radio frequency identification tag antenna 400 sends the current to the current-to-voltage converting circuit 404. The current-to-voltage converting circuit 404 converts the current into a first voltage. The current-to-voltage converting circuit 404 sends the first voltage to the voltage adjusting circuit 406. The voltage adjusting circuit 406 adjusts the first voltage as a second voltage.

The voltage adjusting circuit 406 sends the second voltage to the radio frequency identification tag chip 402 to drive the radio frequency identification tag chip 402. According to the wireless radio frequency signal 300, the radio frequency identification tag chip 402 generates a feedback signal 302.

The radio frequency identification tag chip 402 sends the feedback signal 302 to the connection interface 206. After the connection interface 206 receives the feedback signal 302, the connection interface 206 sends an informing signal 304 to the microprocessor 200. After the microprocessor 200 receives the informing signal 304, the microprocessor 200 sends a driving signal 306 to the driver 204. After the driver 204 receives the driving signal 306, the driver 204 sends a display signal 308 to the display unit 100. After the display unit 100 receives the display signal 308, the display unit 100 displays an information of the display signal 308.

The sensor 202 detects a temperature and a vibration level of the radio frequency identification tag apparatus 10 to obtain a detecting data signal 310. The sensor 202 sends the detecting data signal 310 to the microprocessor 200, so that the display unit 100 displays an information of the detecting data signal 310.

When the radio frequency identification tag unit 102 sends the feedback signal 302 back to the radio frequency identification reader 20, the radio frequency identification tag antenna 400 is wirelessly coupled to the laser direct structuring antenna unit 104, so that a working distance of the radio frequency identification tag antenna 400 is increased and a transmitting data distance of the radio frequency identification tag apparatus 10 is longer. After being coupled, the radio frequency identification tag apparatus 10 generates a coupled antenna frequency band. The coupled antenna frequency band is between 860 MHz to 960 MHz, which comprise the ultrahigh frequency band in the world.

The radio frequency identification tag apparatus 10 further comprises a plastic panel 208. The display unit 100, the radio frequency identification tag unit 102, the laser direct structuring antenna unit 104 and the other components mentioned above are arranged on the plastic panel 208.

Moreover, after the radio frequency identification tag antenna 400 is wirelessly coupled to the laser direct structuring antenna unit 104, the radio frequency identification tag apparatus 10 can provide a larger antenna gain, and a gain loss of the radio frequency identification tag unit 102 is 0 db. The radio frequency identification tag apparatus 10 proceeds with wireless radio frequency signals transmission and receiving without loss, so that the efficiency of the radio frequency identification tag apparatus 10 is improved.

Moreover, the radio frequency identification tag apparatus 10 can still be wirelessly coupled to the metal, so that the transmitting data distance of the radio frequency identification tag apparatus 10 is longer.

Moreover, the radio frequency identification tag unit 102 is a semi-passive radio frequency identification tag which comprises a battery (not shown in FIG. 2). The battery supplies power to the radio frequency identification tag chip 402, so that the radio frequency identification tag chip 402 works. The battery is a carbon-zinc battery or an alkaline battery.

Figure 3:
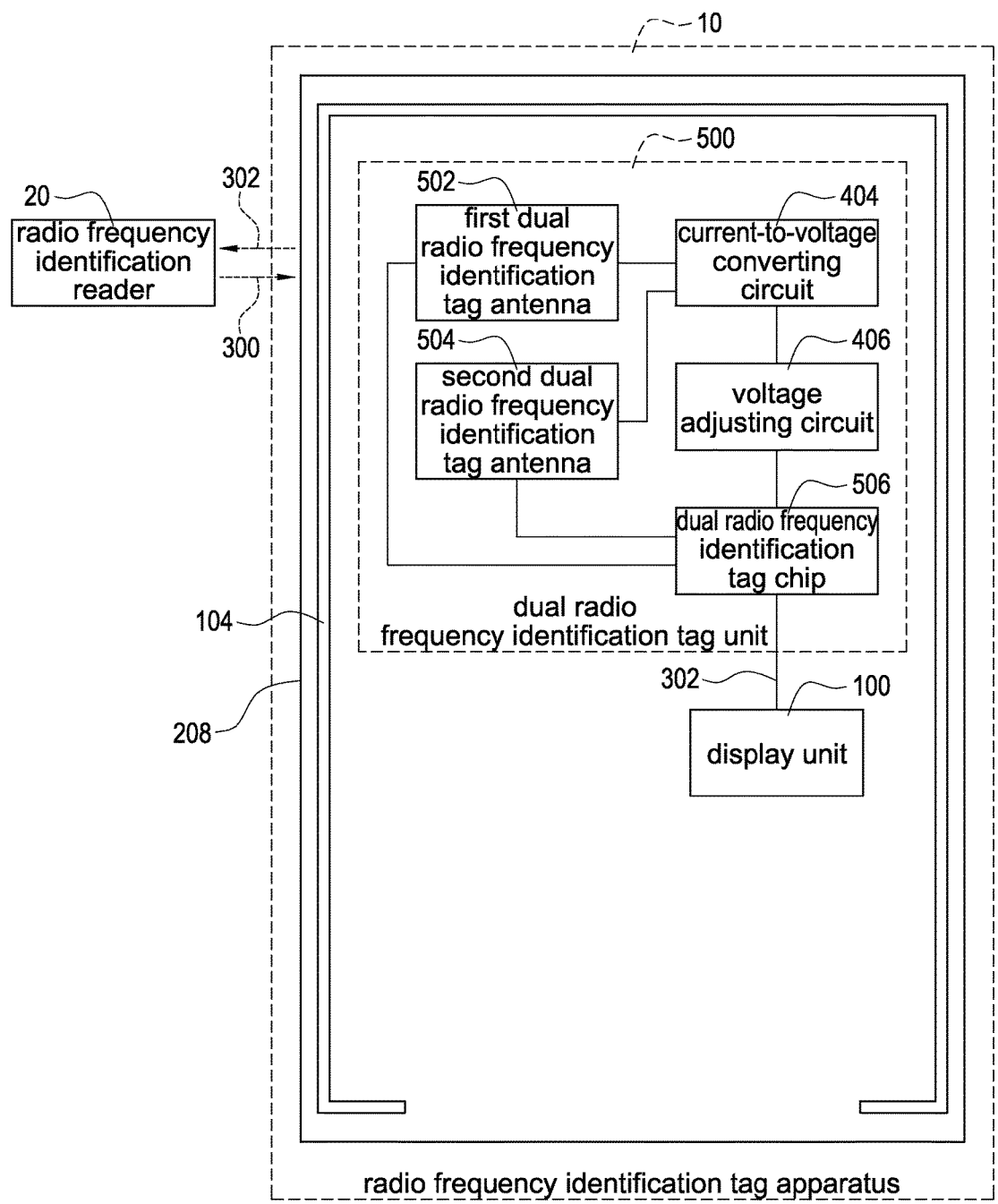
FIG. 3 shows a block diagram of the third embodiment of the radio frequency identification tag apparatus with a laser direct structuring antenna of the present invention.

FIG. 3 shows a block diagram of the third embodiment of the radio frequency identification tag apparatus with a laser direct structuring antenna of the present invention. A radio frequency identification tag apparatus 10 is applied to a metal (not shown in FIG. 3). The radio frequency identification tag apparatus 10 comprises a display unit 100, a dual radio frequency identification tag unit 500 and a laser direct structuring antenna unit 104. The dual radio frequency identification tag unit 500 comprises a first dual radio frequency identification tag antenna 502, a second dual radio frequency identification tag antenna 504, a dual radio frequency identification tag chip 506, a current-to-voltage converting circuit 404 and a voltage adjusting circuit 406.

The display unit 100 is electrically connected to the dual radio frequency identification tag unit 500. The laser direct structuring antenna unit 104 is wirelessly coupled to the dual radio frequency identification tag unit 500. The dual radio frequency identification tag chip 506 is electrically connected to the first dual radio frequency identification tag antenna 502 and the second dual radio frequency identification tag antenna 504. The current-to-voltage converting circuit 404 is electrically connected to the first dual radio frequency identification tag antenna 502 and the second dual radio frequency identification tag antenna 504. The voltage adjusting circuit 406 is electrically connected to the current-to-voltage converting circuit 404 and the dual radio frequency identification tag chip 506. The dual radio frequency identification tag chip 506 is electrically connected to the display unit 100.

The radio frequency identification reader 20 sends a wireless radio frequency signal 300 to the laser direct structuring antenna unit 104. The laser direct structuring antenna unit 104 is wirelessly coupled to the first dual radio frequency identification tag antenna 502 and the second dual radio frequency identification tag antenna 504, so that the laser direct structuring antenna unit 104 sends the wireless radio frequency signal 300 to the first dual radio frequency identification tag antenna 502 and the second dual radio frequency identification tag antenna 504. The first dual radio frequency identification tag antenna 502 and the second dual radio frequency identification tag antenna 504 induce the wireless radio frequency signal 300 to generate a current. The first dual radio frequency identification tag antenna 502 and the second dual radio frequency identification tag antenna 504 send the current to the current-to-voltage converting circuit 404. The current-to-voltage converting circuit 404 converts the current into a first voltage. The current-to-voltage converting circuit 404 sends the first voltage to the voltage adjusting circuit 406. The voltage adjusting circuit 406 adjusts the first voltage as a second voltage.

The voltage adjusting circuit 406 sends the second voltage to the dual radio frequency identification tag chip 506 to drive the dual radio frequency identification tag chip 506. According to the wireless radio frequency signal 300, the dual radio frequency identification tag chip 506 generates a feedback signal 302. The dual radio frequency identification tag chip 506 sends the feedback signal 302 to the display unit 100. After the display unit 100 receives the feedback signal 302, the display unit 100 displays an information of the feedback signal 302.

When the dual radio frequency identification tag unit 500 sends the feedback signal 302 back to the radio frequency identification reader 20, the first dual radio frequency identification tag antenna 502 and the second dual radio frequency identification tag antenna 504 are wirelessly coupled to the laser direct structuring antenna unit 104, so that working distances of the first dual radio frequency identification tag antenna 502 and the second dual radio frequency identification tag antenna 504 are increased and a transmitting data distance of the radio frequency identification tag apparatus 10 is longer. After being coupled, the radio frequency identification tag apparatus 10 generates a coupled antenna frequency band. The coupled antenna frequency band is between 860 MHz to 960 MHz, which comprise the ultrahigh frequency band in the world.

The radio frequency identification tag apparatus 10 further comprises a plastic panel 208. The display unit 100, the dual radio frequency identification tag unit 500 and the laser direct structuring antenna unit 104 are arranged on the plastic panel 208.

Moreover, after the first dual radio frequency identification tag antenna 502 and the second dual radio frequency identification tag antenna 504 are wirelessly coupled to the laser direct structuring antenna unit 104, the radio frequency identification tag apparatus 10 can provide a larger antenna gain, and a gain loss of the dual radio frequency identification tag unit 500 is 0 db. The radio frequency identification tag apparatus 10 proceeds with wireless radio frequency signals transmission and receiving without loss, so that the efficiency of the radio frequency identification tag apparatus 10 is improved.

Moreover, the radio frequency identification tag apparatus 10 can still be wirelessly coupled to the metal, so that the transmitting data distance of the radio frequency identification tag apparatus 10 is longer.

Moreover, the dual radio frequency identification tag unit 500 is a semi-passive radio frequency identification tag which comprises a battery (not shown in FIG. 3). The battery supplies power to the dual radio frequency identification tag chip 506, so that the dual radio frequency identification tag chip 506 works. The battery is a carbon-zinc battery or an alkaline battery.

The dual radio frequency identification tag unit 500 is a dual radio frequency (the ultrahigh frequency and the high frequency) identification tag. The first dual radio frequency identification tag antenna 502 is a UHF tag. The second dual radio frequency identification tag antenna 504 is a HF tag. The dual radio frequency identification tag unit 500 can be operated in the two different frequency bands, but only one memory (not shown in FIG. 3) stores data, so that using a mobile apparatus (not shown in FIG. 3) reading data which is sent back with HF through, for example, NFC (near field communication) is equal to reading data which is sent back with UHF. The dual radio frequency identification tag unit 500 increases the convenience of operation for the user.

Figure 4:
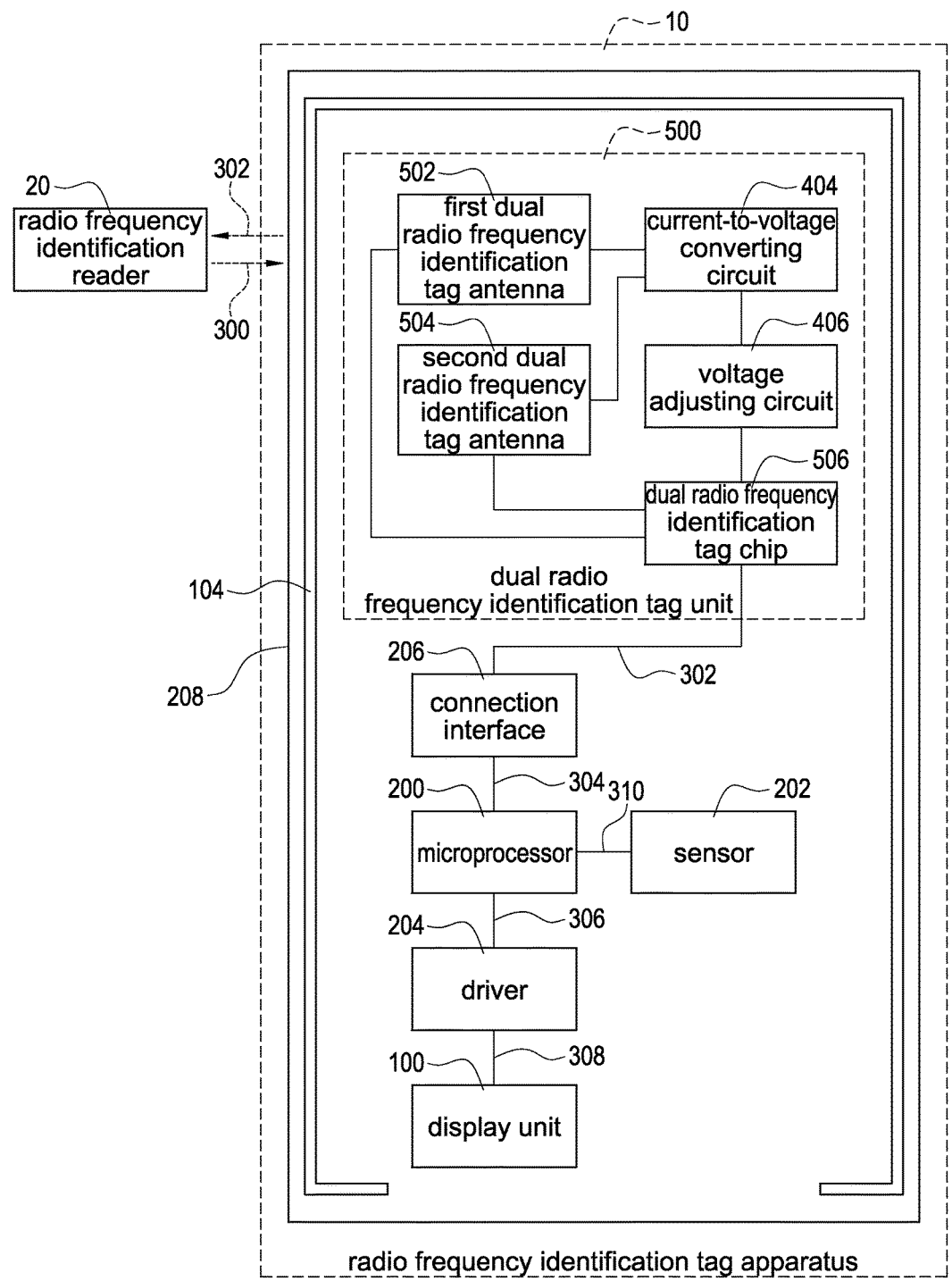
FIG. 4 shows a block diagram of the fourth embodiment of the radio frequency identification tag apparatus with a laser direct structuring antenna of the present invention.

FIG. 4 shows a block diagram of the fourth embodiment of the radio frequency identification tag apparatus with a laser direct structuring antenna of the present invention. A radio frequency identification tag apparatus 10 is applied to a metal (not shown in FIG. 4). The radio frequency identification tag apparatus 10 comprises a display unit 100, a dual radio frequency identification tag unit 500, a laser direct structuring antenna unit 104, a microprocessor 200, a sensor 202, a driver 204 and a connection interface 206. The dual radio frequency identification tag unit 500 comprises a first dual radio frequency identification tag antenna 502, a second dual radio frequency identification tag antenna 504, a dual radio frequency identification tag chip 506, a current-to-voltage converting circuit 404 and a voltage adjusting circuit 406.

The dual radio frequency identification tag unit 500 is electrically connected to the connection interface 206. The connection interface 206 is electrically connected to the microprocessor 200. The connection interface 206 is a serial peripheral interface (SPI) or an inter-integrated circuit (I2C). The microprocessor 200 is electrically connected to the sensor 202. The microprocessor 200 is electrically connected to the driver 204. The driver 204 is electrically connected to the display unit 100. The laser direct structuring antenna unit 104 is wirelessly coupled to the dual radio frequency identification tag unit 500. The dual radio frequency identification tag chip 506 is electrically connected to the first dual radio frequency identification tag antenna 502 and the second dual radio frequency identification tag antenna 504. The current-to-voltage converting circuit 404 is electrically connected to the first dual radio frequency identification tag antenna 502 and the second dual radio frequency identification tag antenna 504. The voltage adjusting circuit 406 is electrically connected to the current-to-voltage converting circuit 404 and the dual radio frequency identification tag chip 506. The dual radio frequency identification tag chip 506 is electrically connected to the connection interface 206.

The radio frequency identification reader 20 sends a wireless radio frequency signal 300 to the laser direct structuring antenna unit 104. The laser direct structuring antenna unit 104 is wirelessly coupled to the first dual radio frequency identification tag antenna 502 and the second dual radio frequency identification tag antenna 504, so that the laser direct structuring antenna unit 104 sends the wireless radio frequency signal 300 to the first dual radio frequency identification tag antenna 502 and the second dual radio frequency identification tag antenna 504. The first dual radio frequency identification tag antenna 502 and the second dual radio frequency identification tag antenna 504 induce the wireless radio frequency signal 300 to generate a current. The first dual radio frequency identification tag antenna 502 and the second dual radio frequency identification tag antenna 504 send the current to the current-to-voltage converting circuit 404. The current-to-voltage converting circuit 404 converts the current into a first voltage. The current-to-voltage converting circuit 404 sends the first voltage to the voltage adjusting circuit 406. The voltage adjusting circuit 406 adjusts the first voltage as a second voltage.

The voltage adjusting circuit 406 sends the second voltage to the dual radio frequency identification tag chip 506 to drive the dual radio frequency identification tag chip 506. According to the wireless radio frequency signal 300, the dual radio frequency identification tag chip 506 generates a feedback signal 302. The dual radio frequency identification tag chip 506 sends the feedback signal 302 to the connection interface 206. After the connection interface 206 receives the feedback signal 302, the connection interface 206 sends an informing signal 304 to the microprocessor 200. After the microprocessor 200 receives the informing signal 304, the microprocessor 200 sends a driving signal 306 to the driver 204. After the driver 204 receives the driving signal 306, the driver 204 sends a display signal 308 to the display unit 100. After the display unit 100 receives the display signal 308, the display unit 100 displays an information of the display signal 308.

The sensor 202 detects a temperature and a vibration level of the radio frequency identification tag apparatus 10 to obtain a detecting data signal 310. The sensor 202 sends the detecting data signal 310 to the microprocessor 200, so that the display unit 100 displays an information of the detecting data signal 310.

When the dual radio frequency identification tag unit 500 sends the feedback signal 302 back to the radio frequency identification reader 20, the first dual radio frequency identification tag antenna 502 and the second dual radio frequency identification tag antenna 504 are wirelessly coupled to the laser direct structuring antenna unit 104, so that working distances of the first dual radio frequency identification tag antenna 502 and the second dual radio frequency identification tag antenna 504 are increased and a transmitting data distance of the radio frequency identification tag apparatus 10 is longer. After being coupled, the radio frequency identification tag apparatus 10 generates a coupled antenna frequency band. The coupled antenna frequency band is between 860 MHz to 960 MHz, which comprise the ultrahigh frequency band in the world.

The radio frequency identification tag apparatus 10 further comprises a plastic panel 208. The display unit 100, the dual radio frequency identification tag unit 500, the laser direct structuring antenna unit 104 and the other components mentioned above are arranged on the plastic panel 208.

The dual radio frequency identification tag unit 500 is a dual radio frequency (the ultrahigh frequency and the high Frequency) identification tag. The first dual radio frequency identification tag antenna 502 is a UHF tag. The second dual radio frequency identification tag antenna 504 is a HF tag. The dual radio frequency identification tag unit 500 can be operated in the two different frequency bands, but only one memory (not shown in FIG. 4) stores data, so that using a mobile apparatus (not shown in FIG. 4) reading data which is sent back with HF through, for example, NFC (near field communication) is equal to reading data which is sent back with UHF. The dual radio frequency identification tag unit 500 increases the convenience of operation for the user.

Moreover, after the first dual radio frequency identification tag antenna 502 and the second dual radio frequency identification tag antenna 504 are wirelessly coupled to the laser direct structuring antenna unit 104, the radio frequency identification tag apparatus 10 can provide a larger antenna gain, and a gain loss of the dual radio frequency identification tag unit 500 is 0 db. The radio frequency identification tag apparatus 10 proceeds with wireless radio frequency signals transmission and receiving without loss, so that the efficiency of the radio frequency identification tag apparatus 10 is improved.

Moreover, the radio frequency identification tag apparatus 10 can still be wirelessly coupled to the metal, so that the transmitting data distance of the radio frequency identification tag apparatus 10 is longer.

Moreover, the dual radio frequency identification tag unit 500 is a semi-passive radio frequency identification tag which comprises a battery (not shown in FIG. 4). The battery supplies power to the dual radio frequency identification tag chip 506, so that the dual radio frequency identification tag chip 506 works. The battery is a carbon-zinc battery or an alkaline battery.

The advantages of the present invention comparing to the related art radio frequency identification tag which is applicable to metal objects are that the volume is reduced, the working distance is increased, and the cost is reduced. The advantage of the present invention comparing to the related art radio frequency identification tag which is not suitable for metal objects is that the working distance is increased.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A radio frequency identification tag apparatus comprising:
   a display unit;
   a radio frequency identification tag unit electrically connected to the display unit; and
   a laser direct structuring antenna unit wirelessly coupled to the radio frequency identification tag unit,
   wherein the radio frequency identification tag unit comprises:
   a radio frequency identification tag antenna wirelessly coupled to the laser direct structuring antenna unit;
   a radio frequency identification tag chip electrically connected to the radio frequency identification tag antenna;
   a current-to-voltage converting circuit electrically connected to the radio frequency identification tag antenna; and
   a voltage adjusting circuit electrically connected to the radio frequency identification tag chip and the current-to-voltage converting circuit.

2. The radio frequency identification tag apparatus in claim 1 further comprising:
   a plastic panel,
   wherein the display unit, the radio frequency identification tag unit and the laser direct structuring antenna unit are arranged on the plastic panel.

3. The radio frequency identification tag apparatus in claim 2 further comprising:
   a microprocessor electrically connected to the radio frequency identification tag unit.

4. The radio frequency identification tag apparatus in claim 3 further comprising:
   a sensor electrically connected to the microprocessor,
   wherein the sensor detects a temperature and a vibration level of a carrier.

5. The radio frequency identification tag apparatus in claim 4 further comprising:
   a driver electrically connected to the microprocessor and the display unit,
   wherein the driver drives the display unit to display an information.

6. The radio frequency identification tag apparatus in claim 5 further comprising:
   a connection interface electrically connected to the microprocessor and the radio frequency identification tag unit.

7. The radio frequency identification tag apparatus in claim 6, wherein the display unit is an electronic paper or a liquid crystal display.

8. The radio frequency identification tag apparatus in claim 7, wherein the radio frequency identification tag unit is a dual radio frequency identification tag.

9. The radio frequency identification tag apparatus in claim 8, wherein the connection interface is a serial peripheral interface or an inter-integrated circuit.

* * * * *